United States Patent
Murray (10) Patent No.: US 10,503,156 B2
(45) Date of Patent: Dec. 10, 2019

(54) METHODS AND APPARATUS TO DEFINE STAGES FOR MULTI-VARIATE BATCH CONTROL ANALYTICS

(71) Applicant: Fisher-Rosemount Systems, Inc., Round Rock, TX (US)

(72) Inventor: Steve Murray, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 516 days.

(21) Appl. No.: 14/858,819

(22) Filed: Sep. 18, 2015

(65) Prior Publication Data
US 2017/0083012 A1   Mar. 23, 2017

(51) Int. Cl.
G05B 19/418   (2006.01)

(52) U.S. Cl.
CPC ........... *G05B 19/41885* (2013.01); *G05B 2219/31265* (2013.01); *G05B 2219/32077* (2013.01); *G05B 2219/32096* (2013.01); *G05B 2219/32201* (2013.01); *G05B 2219/42155* (2013.01); *Y02P 90/02* (2015.11)

(58) Field of Classification Search
CPC .......... G05B 2219/31288; G05B 2219/31318; G05B 2219/31265; G05B 2219/31357; G05B 2219/32077; G05B 2219/32201; G05B 19/41885; G05B 23/024; Y02P 90/26
See application file for complete search history.

(56) References Cited

U.S. PATENT DOCUMENTS

| | | | | |
|---|---|---|---|---|
| 5,058,043 A | * | 10/1991 | Skeirik | B01J 19/004 700/167 |
| 6,522,934 B1 | * | 2/2003 | Irwin | G05B 19/0426 700/11 |
| 7,123,978 B2 | * | 10/2006 | Hartman | G06N 99/005 700/108 |

(Continued)

FOREIGN PATENT DOCUMENTS

| | | |
|---|---|---|
| GB | 2518484 | 3/2015 |
| WO | 2016041775 | 3/2016 |

OTHER PUBLICATIONS

ISA—The Instrumentation, Systems and Automation Society, "Batch Control Part 1: Models and Terminology," Oct. 23, 1995, 98 pages.

(Continued)

*Primary Examiner* — Crystal J Barnes-Bullock
(74) *Attorney, Agent, or Firm* — Hanley, Flight & Zimmerman, LLC (57) ABSTRACT

Methods and apparatus to define stages for multi-variate batch control analytics are disclosed. An example method includes determining, with the processor, a current stage in a current batch process based on a current value of a batch stage parameter. The current value of the batch stage parameter determined based on process control data associated with process parameters in the current batch process. The current stage determined independent of batch events defined by at least one of a start or an end of procedures, unit procedures, operations, or phases in a batch recipe. The example method further includes applying, with the processor, a model to the current batch process, the model corresponding to the current stage.

19 Claims, 8 Drawing Sheets

(56) References Cited

U.S. PATENT DOCUMENTS

| | | | | |
|---|---|---|---|---|
| 7,249,356 B1* | 7/2007 | Wilson | ............ | G05B 19/41865 700/17 |
| 7,793,292 B2* | 9/2010 | Worek | ............ | G05B 19/4183 700/17 |
| 7,962,227 B2* | 6/2011 | Worek | ............ | G05B 19/4183 700/108 |
| 8,055,370 B1 | 11/2011 | Achtnig et al. | | |
| 8,606,379 B2* | 12/2013 | Marruchella | .... | G05B 19/41835 700/100 |
| 8,671,460 B1* | 3/2014 | Havekost | ......... | G05B 19/0428 726/2 |
| 8,839,252 B1* | 9/2014 | Nolan | ...... | G06F 8/34 718/101 |
| 8,880,203 B2* | 11/2014 | Wojsznis | ............ | G05B 23/024 700/103 |
| 9,086,695 B2* | 7/2015 | Worek | ............ | G05B 19/4183 |
| 9,158,295 B2* | 10/2015 | Blevins | ................ | G05B 17/02 |
| 9,680,893 B2* | 6/2017 | Banerjee | ............... | H04L 65/60 |
| 10,018,997 B2* | 7/2018 | Worek | ............ | G05B 19/41885 |
| 2009/0143873 A1 | 6/2009 | Navratil et al. | | |
| 2011/0142928 A1* | 6/2011 | Piene | .................. | A61K 9/0056 424/465 |
| 2011/0288660 A1 | 11/2011 | Vvojsznis et al. | | |
| 2011/0288837 A1* | 11/2011 | Blevins | ................ | G05B 17/02 703/6 |
| 2015/0005903 A1* | 1/2015 | Worek | ............ | G05B 19/41885 700/44 |

OTHER PUBLICATIONS

Emerson Process Management, "Batch Analytics," Sep. 2015, 5 pages.

Emerson Process Management, "Batch Analytics Deployment," Sep. 2015, 7 pages.

Intellectual Property Office of Great Britain, "Search Report," issued in connection with Patent Application No. GB1615624.2, dated Mar. 3, 2017, 9 pages.

* cited by examiner

METHODS AND APPARATUS TO DEFINE STAGES FOR MULTI-VARIATE BATCH CONTROL ANALYTICS

FIELD OF THE DISCLOSURE

This disclosure relates generally to process control systems and, more particularly, to methods and apparatus to define stages for multi-variate batch control analytics.

BACKGROUND

Some process control systems are implemented using batch process control. During the execution of a batch process, operators and/or other plant personnel may implement analytical models that are applied to the current batch process to ensure the batch process proceeds as expected. The models can be generated based on data collected from previously executed batch processes. The effectiveness of the analytical models depends upon the reliability of the data used in generating the models and the accuracy of the models in representing actual processing conditions of the current batch process to which the models are being applied.

SUMMARY

Example methods and apparatus to define stages for multi-variate batch control analytics are disclosed. An example method includes determining, with the processor, a current stage in a current batch process based on a current value of a batch stage parameter. The current value of the batch stage parameter determined based on process control data associated with process parameters in the current batch. The current stage determined independent of batch events defined by at least one of a start or an end of procedures, unit procedures, operations, or phases in a batch recipe. The example method further includes applying, with the processor, a model to the current batch process, the model corresponding to the current stage.

An example apparatus includes a batch stage analyzer, implemented via a processor, to determine a current stage in a current batch process based on a current value of a batch stage parameter. The current value of the batch stage parameter determined based on process control data associated with process parameters in the current batch. The current stage is determined independent of batch events defined by at least one of a start or an end of procedures, unit procedures, operations, or phases in a batch recipe. The example apparatus also includes a batch model analyzer to apply a model to the current batch process, the model corresponding to the current stage.

An example article of manufacture includes instructions that, when executed, cause a machine to at least determine a current stage in a current batch process based on a current value of a batch stage parameter. The current value of the batch stage parameter determined based on process control data associated with process parameters in the current batch. The current stage is determined independent of batch events defined by at least one of a start or an end of procedures, unit procedures, operations, or phases in a batch recipe. The instructions further cause the machine to apply a model to the current batch process, the model corresponding to the current stage.

DETAILED DESCRIPTION

A standardized procedural control model or framework for batch control was adopted by the International Society of Automation (ISA) in 1995 as ISA-88. In particular, the ISA-88 standard defines the procedural control framework for a batch process in the context of a recipe or procedure that may include an ordered sequence of unit procedures, which in turn may include an ordered sequence of operations, which may in turn include an ordered set of phases. A Gantt-type chart representative of the procedural elements in an example batch recipe 100 is shown in FIG. 1

Figure 1:
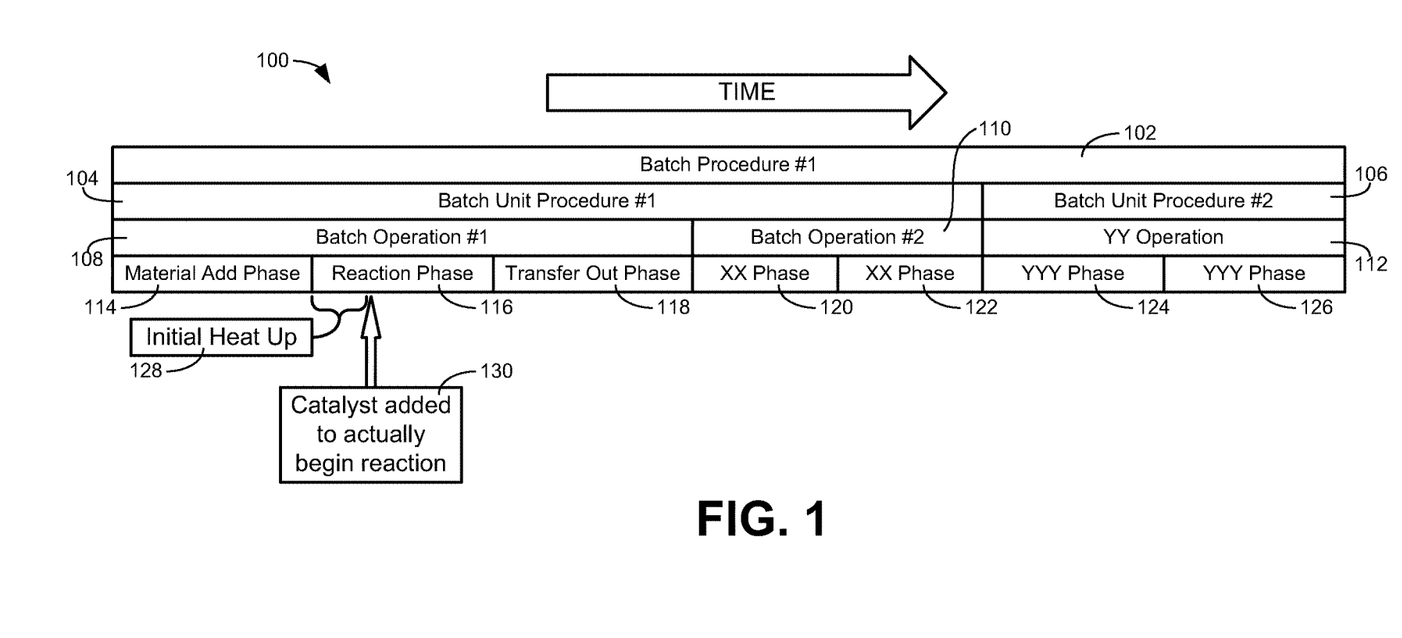
FIG. 1 is a Gantt-type chart representative of the procedural elements in an example batch recipe.

As shown in the illustrated example of FIG. 1, the top layer or highest level element in the recipe 100 is a batch procedure 102 (sometimes called a "recipe procedure" or simply "procedure"). A batch procedure defines the overall strategy to carry out a batch process. The batch procedure 102 of the illustrated example includes two batch unit procedures 104, 106 (sometimes called a "recipe unit procedure" or simply "unit procedure"). A batch unit procedure defines the strategy to carry out all or a part of a batch procedure within a particular unit in the equipment hierarchy of a process control system. The third level of procedural elements as shown in the illustrated example corresponds to recipe or batch operations. A batch operation defines the strategy to carry out a particular and independent processing activity within a batch unit procedure. As shown in FIG. 1, the first batch unit procedure 104 includes two batch operations 108, 110 while the second batch unit procedure 106 includes one batch operation 112. The lowest procedural elements for batch control are phases, which define the strategy to carry out specific process-oriented tasks or functions associated with the execution of a batch operation. In the illustrated example, the first operation 108 of the first unit procedure 104 includes three phases 114, 116, 118, while the second operation 110 of the first unit procedure 104 includes two phases 120, 122. Further, in the illustrated example, the operation 112 of the second unit procedure 106 includes two phases 124, 126.

While most of the different procedural elements in the example recipe 100 of FIG. 1 are represented with generic labels, the phases 114, 116, 118 associated with the first operation 108 of the first unit procedure 104 include more particular labels for purposes of explanation. In particular, in the illustrated example, the first phase 114 is a "Material Add Phase" in which materials to be processed are introduced into a tank or other container. The second phase 116 is a "Reaction Phase" in which the materials undergo a chemical and/or physical change. The third phase 118, in the illustrated example, is a "Transfer Out Phase" in which the product of the reaction phase is removed from the tank for further processing associated with the second operation 110.

Typically, each of the procedural elements in a recipe (e.g., a procedure, a unit procedure, an operation, a phase)

are configured as individual modular segments that are arranged in a batch engineering environment to define the sequential execution of a batch process. As shown in the illustrated example of FIG. 1, the batch unit procedures 104, 106, the batch operations 108, 110, 112, and the phases 114, 116, 118, 120, 122, 124, 126 are ordered in a contiguous sequence through time. Although not represented in FIG. 1, in some examples, multiple phases corresponding to the same batch operation may be implemented concurrently. Similarly, in some examples, multiple batch operations may be executed in parallel within a particular unit. Further, different batch unit procedures associated with different units in a complete batch process may be executed in parallel.

The modular segmentation and contiguous arrangement of the procedural elements in a batch recipe enable the clear identification of the current procedural elements being executed at any point in time during a batch process by identifying the start and end of each successive procedural element. The start of a procedural batch recipe element (e.g., a batch procedure, a batch unit procedure, a batch operation, a phase) is determined based on when the modular segment of configuration for the batch begins executing, while the end of the procedural element is determined based on when the corresponding segment of configuration terminates. The beginning (initiation) and ending (termination) of each procedural element in a batch process is referred to herein as a batch event. Typically, batch events, and the corresponding times at which such events occur, are stored in a batch historian database. In some implementations, the batch historian database is separate from a continuous historian database, which stores the values of all process parameters being monitored throughout a batch process. Both the batch historian database and the continuous historian database may store data for multiple different batch processes executed over an extended period of time.

Most batch processes include multiple chemical and/or physical changes to the raw input materials before arriving at the desired output products and/or materials. With each such chemical and/or physical change (e.g., due to a material addition triggering a temperature reaction, a flow varying in effect on temperature based on a tank level, etc.), the process dynamics or nature of interactions between various process parameters also change. A period of time within a batch process that defines a particular interaction of process parameters (i.e., exhibits particular process dynamics) is referred to herein as a process stage (or simply "stage"), which is similarly defined in ISA-88. For example, adding water to a tank of material to be processed does not increase the temperature of the material, but adding a reactive chemical to the tank that triggers a chemical reaction may result in an increase in the tank temperature of the tank contents. Because the interactions of process parameters (tank contents and tank temperature) are different in these two scenarios, the charge of water and the charge of the chemical would constitute different stages.

Frequently, batch control analytics are implemented during the execution of a batch process to improve and/or maintain the safety, performance, and/or efficiency of the batch process. More particularly, in some instances, batch control analytics involve the multi-variate analysis of a batch process relative to models of the batch process generated from previously executed (e.g., historically archived) batch processes. Typically, a different model is applied to a batch process during each different stage because of the different process dynamics during each stage. For instance, with reference to the above example, a model for the charge of water into a tank of material would not be representative of the process when the reactive chemical is being introduced into the tank. Accordingly, the water charging stage and the chemical charging stage may be analyzed using separate models specific to the process dynamics of each stage.

The effectiveness of applying analytical models to a batch process (i.e., individual models to individual stages of a batch process) depends upon the reliability of the data used to initially generate the models and upon how relevant the model being applied is to the current stage in the batch process. That is, if process control data collected during the water charging stage of previously executed batch processes are included when generating a model for the reactive chemical charging stage, the resulting model is going to be less reliable than if the data used to generate the model was limited to specifically when the reactive chemical is introduced into the process. Likewise, if a model (even though based on the correct historical data from previously executed batch processes) is applied in a current batch process before the chemical charging stage actual begins (or extends beyond the end of the resulting reaction), there will be periods of time (either before or after) when the model is being applied to the batch process when it is not relevant to the actual process dynamics present in the process. Accordingly, there is a need to accurately and precisely identify the boundaries or beginning and ending of stages within a batch process both to (1) identify what data from previously executed batches is relevant to model generation for a particular stage and (2) identify the relevant periods of time when such a model is to be applied during a current batch process.

Known batch control analytics techniques identify the beginning and ending of stages based on the beginning and/or ending of the procedural elements of a corresponding batch recipe. That is, the boundaries of a stage are tied to batch events (i.e., the start and/or end of the procedure 102, the unit procedures 104, 106, the operations 108, 110, 112, or the phases 114, 116, 118, 120, 122, 124, 126). While in some instances this may be an accurate assumption, in other instances it is not. For example, as shown in FIG. 1, the phase 116 labeled "Reaction Phase" begins with a period 128 of initial heat up (e.g., until reaching a preset temperature) before a point in time 130 when a catalyst is introduced to actually begin the reaction. In such an example, the process dynamics (i.e., the interactions of the process variables) do not change until the catalyst is added midway into the phase 116. Accordingly, the process stage defining the temporal boundaries of the process dynamics associated with the actual reaction corresponding to the reaction does not begin until the catalyst is added. Thus, an analytical model for the reaction applied to the batch process beginning at the batch event corresponding to the start of the reaction phase 116 is applied before it is relevant to the actual conditions of the batch process. Similarly, a model for the reaction that is generated based on process control data retrieved from previously executed batch processes for a period of time beginning at the batch event corresponding to the start of the reaction phase 116 will be based, at least in part, on data that does not correspond to the stage being modeled.

One solution to the above problem of stage boundaries (i.e., changes in process dynamics) that do not align with batch events (i.e., the beginning or ending of procedural elements in a batch recipe) is to restructure the batch recipe. For example, the reaction phase 116 in FIG. 1 could be separated into two phases; one corresponding to the initial heat up period 128 and the other to begin at the point in time 130 when the catalyst is added. While this solution is possible, it is often impractical as it would likely involve significant costs in time and expense to reconfigure the system and provide operating training for the new system. Furthermore, altering an existing recipe will likely affect quality assessments and/or process validations. Further still, even in a situation where a recipe and its associated procedural elements is reconfigured to more closely align stages to batch events, some process variable interactions (corresponding to a particular stage) may be arrived at during (rather than at the beginning of) a particular functional task such that it would not be possible to isolate the time immediately before the change in process dynamics into a separate phase in a batch recipe.

To overcome the above challenges, the examples disclosed herein identify the current stage in a batch process (and the corresponding beginning and/or ending of the stage) entirely independent of batch events (which define the start and/or end of procedures, unit procedures, operations, and/or phases in a batch recipe). In some examples, the current stage in a batch process is determined based on a value of a batch stage parameter that is calculated based on process control data collected as the batch process is executed. More particularly, the value of the batch stage parameter is defined based on user-specified definitions and/or rules to interpret the process control data and identify the conditions of the process parameters at which point a particular stage begins and/or ends. That is, rather than tying stages to the process logic associated with the start and end of recipe elements (i.e., batch events), in the examples disclosed herein, the current stage is determined based on the conditions of the process parameters being monitored in the system from which the process control data is generated. Thus, the current stage in a batch process can be determined without reference to batch events because the interactions of the process parameters (i.e., the stages) are determined directly (from a calculation of the batch stage parameter) based on the process control data. Furthermore, the particular point in time that a stage begins or ends can be determined based on when the value of the batch stage parameter changes. In some examples, the value of a batch stage parameter (indicative of a particular stage in a batch process) is determined by a controller implementing the corresponding batch process. In some such examples, the value of the batch stage parameter is provided to a continuous historian database for storage along with other process parameter values. In other examples, a batch execution engine may determine the value of the batch stage parameter based on the conditions (e.g., values) of the process parameters as reported by the controller. In addition to being implemented in real-time, such an implementation may be applied, after the fact, to process control data collected from previously executed batch processes that were not configured to calculate and store the batch stage parameter at the time of execution of the batches.

The stage definitions and/or rules that identify or trigger the designation of a particular stage in a batch process can be anything that a process engineer and/or other user specifies based on the process control data. In some examples, multiple conditions may apply to a particular stage. For example, a particular stage may be designated when a tank is heated above a threshold temperature that is variable depending upon the measured level in the tank and when a valve is open to introduce a material into the tank above a specified threshold flowrate. Additionally or alternatively, in some examples, the stage definitions and/or rules may provide that the beginning or ending of a particular stage is designated (e.g., the batch stage parameter is changed) based on an operator input received during runtime of the batch process, regardless of when the operator provides such input (e.g., at any point between successive batch events associated with the beginning and ending of a particular batch recipe element).

Based on the identification of stages in this manner, the precise boundaries (beginning and ending) of each stage can be determined even when the boundaries do not correspond to or align with batch events. As a result, a model corresponding to the designated stage can be applied to a current batch process for the correct period in time, thereby improving the accuracy and reliability of the analytics over many known methods. Furthermore, in some examples, the batch stage parameter is historized or archived within a continuous historian database along with all the other process control data. That is, each time the value of the batch stage parameter changes (corresponding to a beginning or ending of a particular stage), the value and corresponding time is stored. In this manner, the process control data relevant to any particular stage in a previously executed batch process can be easily identified between the archived beginning and ending of the particular stage of interest. Such data is useful to generate a new model (or refine an existing model) for implementation in association with subsequently executed batch processes, thereby further improving the analytics.

Figure 2:
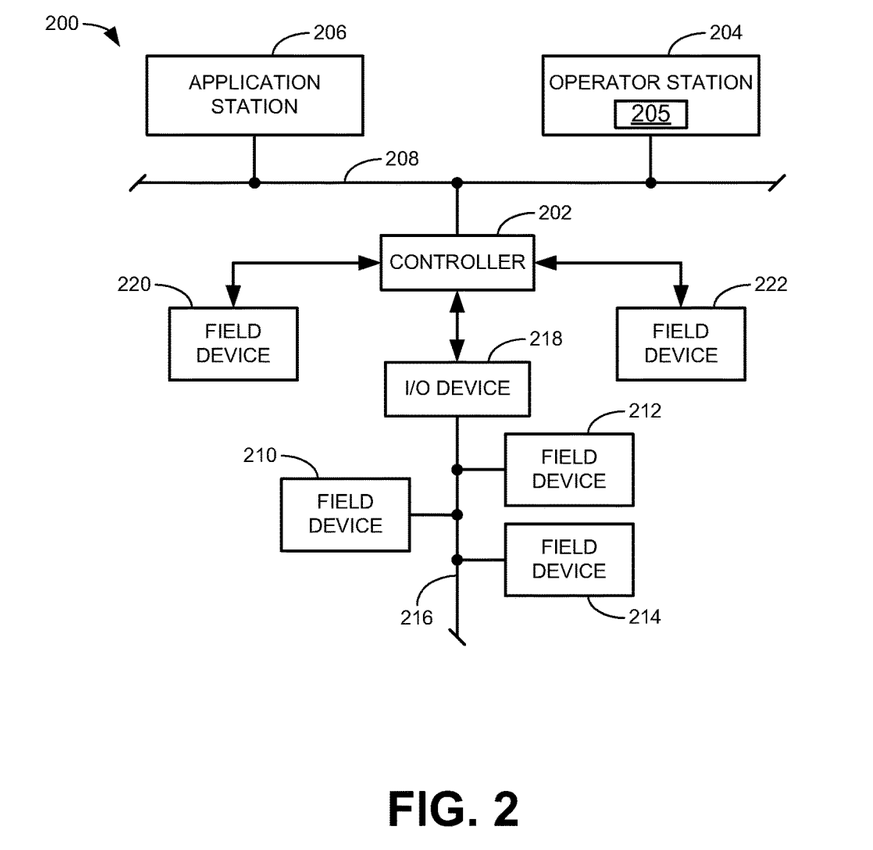
FIG. 2 is a schematic illustration of an example process control system.

FIG. 2 is a schematic illustration of an example process control system 200 that may be implemented in accordance with the teachings disclosed herein. The example process control system 200 of FIG. 2 includes one or more process controllers (one of which is designated at reference numeral 202), one or more operator stations (one of which is designated at reference numeral 204), and one or more workstations (one of which is designated at reference numeral 206). The example process controller 202, the example operator station 204 and the example workstation 206 are communicatively coupled via a bus and/or local area network (LAN) 208, which is commonly referred to as an application control network (ACN).

The example operator station 204 of FIG. 2 allows an operator to review and/or operate one or more operator display screens and/or applications that enable the operator to view process control system parameters, states, conditions, alarms, etc., and/or change process control system settings (e.g., set points, operating states, etc.). An example manner of implementing the example operator station 204 of FIG. 2 is described below in connection with FIG. 3.

The example operator station 204 includes and/or implements an example batch execution engine 205 to execute a batch process within the process control system 200. In some examples, the batch execution engine 205 implements the individually configured procedural elements of a batch recipe in their sequenced order. During the execution of a batch process, the batch execution engine 205 monitors process parameters associated with a current batch process in substantially real-time. In some examples, while the batch execution engine 205 is monitoring process parameters, the resulting process control data (e.g., values of the process parameters) are stored in a continuous historian database for later retrieval as appropriate. Additionally, in some examples, the batch execution engine 205 stores batch events corresponding to the beginning and ending of each recipe element (procedure, unit procedure, operation, or phase) in a batch historian database. In some examples, the batch execution engine 205 uses process control data from previously executed batches to generate models for different periods of time (e.g., different process stages) during the batch process and applies such models to a current batch process in substantially real-time at corresponding periods of time during the current batch process. In some examples, the periods of time (e.g., the stages) are identified in the previously executed batches (for model generation) and/or the current batch stage (for model application) based on when the process control data during the batch processes satisfies the user-specified definitions, rules, and/or conditions to designate the different stages in the batch processes. In some such examples, the determination or designation of a particular stage at a particular point in time in a batch process is accomplished independent of the batch events stored in the batch historian database. That is, the batch execution engine 205 may identify the boundaries (beginning and/or ending) of a particular stage as occurring at some point in time between two adjacent or successive batch events. More particularly, in some examples, the designation of a particular (e.g., current) stage in a batch process is based on the value determined for a batch stage parameter based on the user-specified definitions and/or rules. In some examples, the value of the batch stage parameter is determined by the batch execution engine 205. Additionally or alternatively, in some examples, the value of the batch stage parameter is provided to the batch execution engine 205 by the controller 202 where the user-specified definitions and/or rules are applied to determine the value.

The example workstation 206 of FIG. 2 may be configured as an application station to perform one or more information technology applications, user-interactive applications and/or communication applications. For example, the application station 206 may be configured to perform primarily process control-related applications, while another application station (not shown) may be configured to perform primarily communication applications that enable the process control system 200 to communicate with other devices or systems using any desired communication media (e.g., wireless, hardwired, etc.) and protocols (e.g., HTTP, SOAP, etc.). The example operator station 204 and the example workstation 206 of FIG. 2 may be implemented using one or more workstations and/or any other suitable computer systems and/or processing systems. For example, the operator station 204 and/or workstation 206 could be implemented using single processor personal computers, single or multi-processor workstations, etc.

The example LAN 208 of FIG. 2 may be implemented using any desired communication medium and protocol. For example, the example LAN 208 may be based on a hardwired and/or wireless Ethernet communication scheme. However, any other suitable communication medium(s) and/or protocol(s) could be used. Further, although a single LAN 208 is illustrated in FIG. 2, more than one LAN and/or other alternative communication hardware may be used to provide redundant communication paths between the example systems of FIG. 2.

The example controller 202 of FIG. 2 is coupled to a plurality of smart field devices 210, 212 and 214 via a digital data bus 216 and an input/output (I/O) gateway 218. The smart field devices 210, 212, and 214 may be Fieldbus compliant valves, actuators, sensors, etc., in which case the smart field devices 210, 212, and 214 communicate via the digital data bus 216 using the well-known Foundation Fieldbus protocol. Of course, other types of smart field devices and communication protocols could be used instead. For example, the smart field devices 210, 212, and 214 could instead be Profibus and/or HART compliant devices that communicate via the data bus 216 using the well-known Profibus and HART communication protocols. Additional I/O devices (similar and/or identical to the I/O gateway 218) may be coupled to the controller 202 to enable additional groups of smart field devices, which may be Foundation Fieldbus devices, HART devices, etc., to communicate with the controller 202.

In addition to the example smart field devices 210, 212, and 214, one or more non-smart field devices 220 and 222 may be communicatively coupled to the example controller 202. The example non-smart field devices 220 and 222 of FIG. 2 may be, for example, conventional 4-20 milliamp (mA) or 0-10 volts direct current (VDC) devices that communicate with the controller 202 via respective hardwired links.

The example controller 202 of FIG. 2 may be, for example, a DeltaV™ controller sold by Fisher-Rosemount Systems, Inc., an Emerson Process Management company. However, any other controller could be used instead. Further, while only one controller 202 is shown in FIG. 2, additional controllers and/or process control platforms of any desired type and/or combination of types could be coupled to the LAN 208. In any case, the example controller 202 performs one or more process control routines associated with the process control system 200 that have been generated by a system engineer and/or other system operator using the operator station 204 and which have been downloaded to and/or instantiated in the controller 202.

While FIG. 2 illustrates an example process control system 200 within which the methods and apparatus to define stages for batch control analytics described in greater detail below may be advantageously employed, persons of ordinary skill in the art will readily appreciate that the methods and apparatus to control information presented to operators and/or other personnel described herein may, if desired, be advantageously employed in other process plants and/or process control systems of greater or less complexity (e.g., having more than one controller, across more than one geographic location, etc.) than the illustrated example of FIG. 2.

Figure 3:
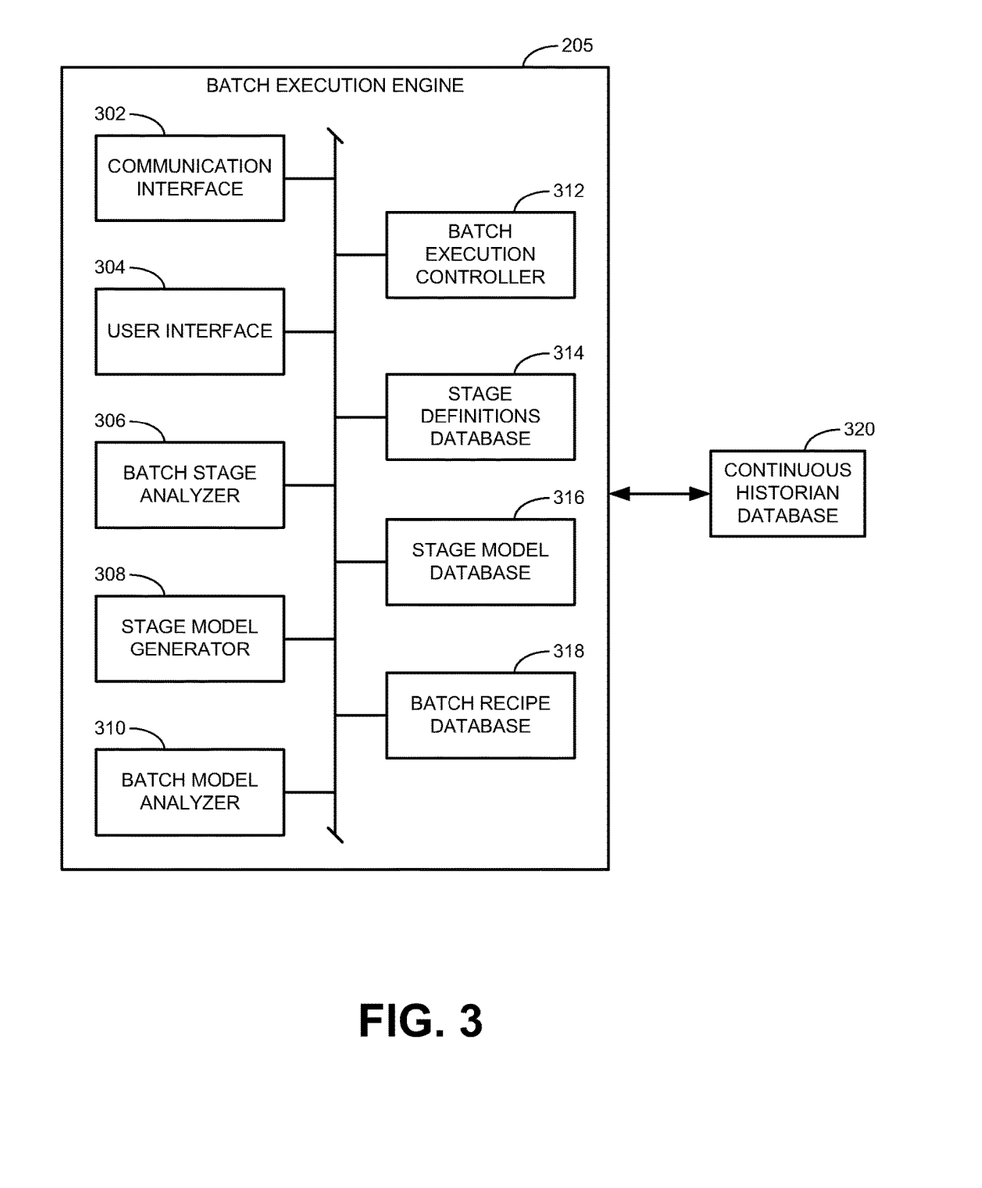
FIG. 3 illustrates an example manner of implementing the example batch execution engine of FIG. 2.

FIG. 3 illustrates an example manner of implementing the example batch execution engine 205 of FIG. 2. The example batch execution engine 205 of FIG. 3 includes an example communication interface 302, an example user interface 304, an example batch stage analyzer 306, an example stage model generator 308, an example batch model analyzer 310, an example batch execution controller 312, an example stage definitions database 314, an example stage model database 316, and an example batch recipe database 318.

The example batch execution engine 205 of FIG. 3 is provided with the example communication interface 302 to communicate with other components within the example process control system 200. In some examples, the communication interface 302 receives process control data (indicative of the values of process parameters) from the field devices 210, 212, 214, 220, 222 via the controller 202. In some examples, such process control data is sent to a continuous historian database 320 for storage. In some examples, the continuous historian database 320 is implemented by the batch execution engine 205. In other examples (as shown in the illustrated example), the continuous historian database 320 is implemented separate from the batch execution engine 205 and/or separate from the operator station 204. In some examples, the process control data are stored both locally (e.g., at the operator station 204) and at a separate location (e.g., the workstation 206).

The example batch execution engine 205 of FIG. 3 is provided with the example user interface 304 to enable operators, engineers, and/or other personnel to configure, analyze, and/or monitor the execution of a batch process and/or select equipment, answer prompts, and/or control the batch process by changing the active step in the batch process. For example, a user may provide information to configure and/or define the procedural elements in a batch recipe to be executed in the process control system 200. In some examples, such information is stored in the batch recipe database 318. Further, in some examples, a user may provide inputs via the user interface 304 outlining the definitions and/or rules that define the conditions of process parameters corresponding to particular process stages during the execution of a batch process. In some such examples, the batch stage analyzer 306 uses the user-specified definitions and the collected process control data to calculate a value for a batch stage parameter. In some examples, the value of the batch stage parameter is indicative of a current stage and the associated boundaries (beginning and ending) of the stage in a currently executing batch process. In some examples, the user-specified definitions and/or rules are stored in the stage definitions database 314. In some examples, the designation of each current stage (as determined by the example batch stage analyzer 306) as well as the corresponding boundaries for the stage is stored in the continuous historian database 320 along with the process control data.

In some examples, a controller (e.g., the controller 202 of FIG. 2) includes a batch stage analyzer (in addition to, or instead of, the batch stage analyzer 306 provided in the batch execution engine 205) to similarly analyze the user-specified definitions and/or rules and determine a current value for the batch stage parameter. In some such examples, the controller may provide the value of the batch stage parameter to the batch execution engine 205 without the batch stage analyzer 306 determining the value. Further, in some such examples, the value of the batch stage parameter provided by the controller may be stored in the continuous historian database 320 along with other process control data provided by the controller.

The example batch execution engine 205 of FIG. 3 is provided with the example stage model generator 308 to generate models of a batch process. In some examples, the models are based on process control data collected from previously executed batch processes. More particularly, in some examples, individual models are generated for each specific stage within a batch process. Thus, in some such examples, the process control data used to generate a model is based on the process control data collected between the beginning and ending of a particular stage to be modeled. In some examples, the beginning and ending of a particular stage in a previously executed batch process (to identify the appropriate process control data) is determined by the example batch stage analyzer 306. In particular, in some examples, the batch stage analyzer 306 analyzes the process control data for the previously executed batch process in connection with the user-specified conditions of the process parameters corresponding to a particular process stage (e.g., the user-specified definitions and/or rules) to determine when the process control data satisfies the conditions for the particular stage of interest. Additionally or alternatively, in some examples, when the batch stage analyzer 306 was used to calculate values for the batch stage parameter at the time a previously executed batch process was executed, the beginning and ending of a particular stage is identified based on the values of the batch stage parameter stored in the continuous historian database 320. Similarly, in examples where the values of the batch stage parameter were previously calculated by a controller (e.g., the controller 202 of FIG. 2), the values may be retrieved from the continuous historian database 320 to directly identify the stage boundaries of the batch process. In some examples, the models generated by the stage model generator 308 are stored in the stage model database 316.

The example batch execution engine 205 of FIG. 3 is provided with the example batch model analyzer 310 to apply the models generated by the stage model generator 308 to a currently executed batch process in substantially real-time. As mentioned above, in some examples, a different model is generated for each stage in a batch process. In such examples, the particular model that is applied to a batch process at any particular time depends upon the current stage. Accordingly, in some examples, the batch model analyzer 310 applies the model corresponding to the current stage within a currently executing batch process designated or identified by the batch stage analyzer 306.

The example batch execution engine 205 of FIG. 3 is provided with the example batch execution controller 312 to control various operations of the batch execution engine 205. In some examples, the batch execution controller 312 communicates instructions or commands to other portions of the example batch execution engine 205 to control the operations of those portions. For example, the batch execution controller 312 directs the sequence and execution of the procedural recipe elements stored in the batch recipe database 318 as well as the identification of a current stage (via the batch stage analyzer 306) and the resulting analytics (via the batch model analyzer 310) using the appropriate model stored in the stage model database 316.

While an example manner of implementing the batch execution engine 205 of FIG. 2 is illustrated in FIG. 3, one or more of the elements, processes and/or devices illustrated in FIG. 3 may be combined, divided, re-arranged, omitted, eliminated and/or implemented in any other way. Further, the example communication interface 302, the example user interface 304, the example batch stage analyzer 306, the example stage model generator 308, the example batch model analyzer 310, the example batch execution controller 312, the example stage definitions database 314, the example stage model database 316, the example batch recipe database 318, and/or, more generally, the example batch execution engine 205 of FIG. 3 may be implemented by hardware, software, firmware and/or any combination of hardware, software and/or firmware. Thus, for example, any of the example communication interface 302, the example user interface 304, the example batch stage analyzer 306, the example stage model generator 308, the example batch model analyzer 310, the example batch execution controller 312, the example stage definitions database 314, the example stage model database 316, the example batch recipe database 318, and/or, more generally, the example batch execution engine 205 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 302, the example user interface 304, the example batch stage analyzer 306, the example stage model generator 308, the example batch model analyzer 310, the example batch execution controller 312, the example stage definitions database 314, the example stage model database 316, and/or the example batch recipe database 318, is/are hereby expressly defined to include a tangible computer readable storage device or storage disk such as a memory, a digital versatile disk (DVD), a compact disk (CD), a Blu-ray disk, etc. storing the software and/or firmware. Further still, the example batch execution engine 205 of FIG. 2 may include one or more elements, processes and/or devices in addition to, or instead of, those illustrated in FIG. 3, and/or may include more than one of any or all of the illustrated elements, processes and devices.

Flowcharts representative of example methods for implementing the batch execution engine 205 of FIGS. 2 and/or 3 are shown in FIGS. 4-7. The methods may be implemented using machine readable instructions that comprise a program for execution by a processor such as the processor 812 shown in the example processor platform 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example batch execution engine 205 may alternatively be used. For example, the order of execution of the blocks may be changed, and/or some of the blocks described may be changed, eliminated, or combined.

As mentioned above, the example methods of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 4-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 4:
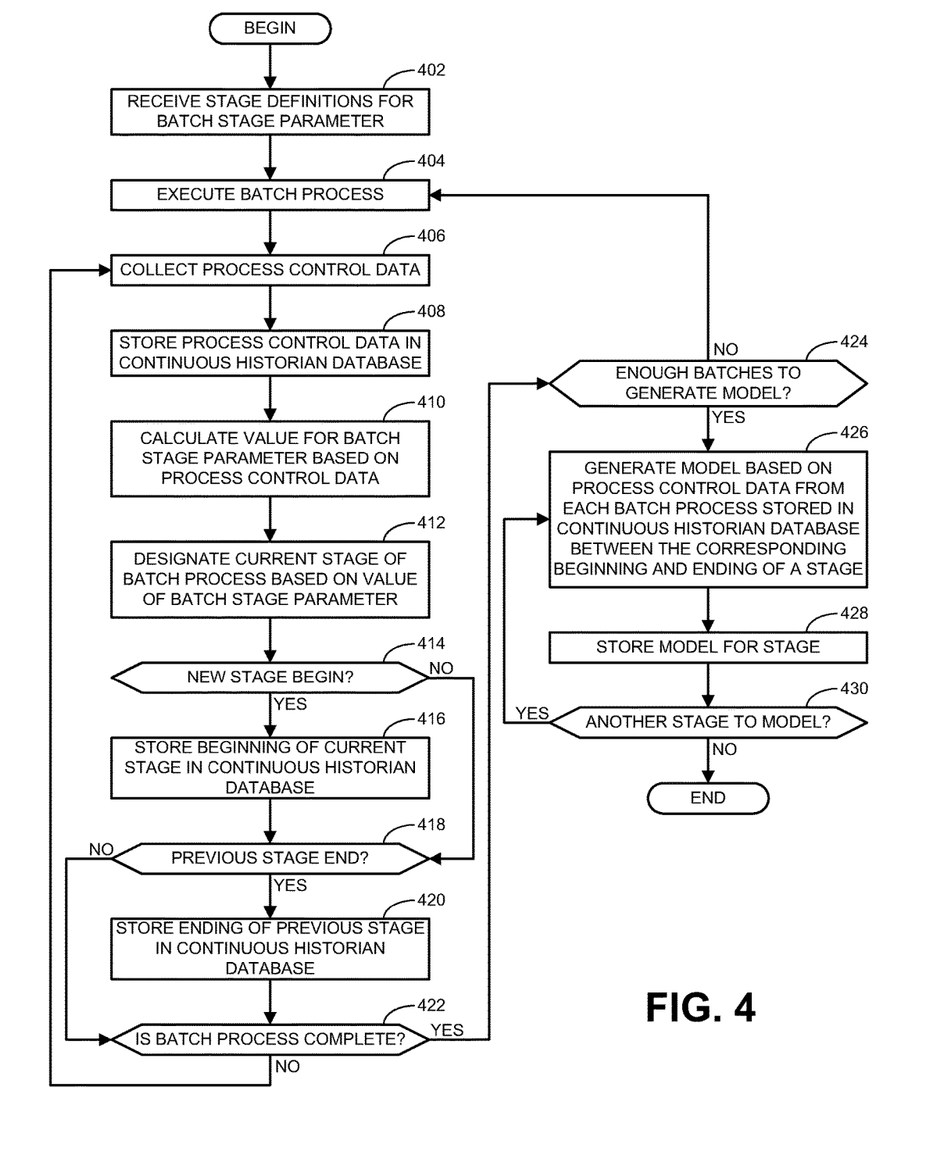
FIGS. 4-7 are flowcharts representative of example methods that may be carried out to implement the example batch execution engine of FIGS. 2 and/or 3.

Turning in detail to the figures, FIG. 4 is a flowchart representative of an example method to identify the beginning and ending of process stages in a set of batch processes based on process control data collected from the batch processes to generate models for each of the stages. The example method of FIG. 4 begins at block 402 where the example user interface 304 receives (e.g., from a user) stage definitions for a batch stage parameter. In some examples, the stage definitions correspond to user-specified definitions, rules, and/or conditions for process parameters associated with a batch process that define the boundaries of stages within the batch process. That is, the stage definitions are specified by a user to identify when interactions of process parameters change throughout the execution of a batch process to demarcate the beginning and ending of different stages. At block 404, the example batch execution controller 312 executes a batch process.

At block 406, the example communication interface 302 collects process control data. At block 408, the example batch execution controller 312 stores the process control data in the example continuous historian database 320. Although the example method indicates the storage of the process control data is directed by the batch execution controller 312, in some examples, such data is stored in the continuous historian database 320 independent of the batch execution engine 205. At block 410, the example batch stage analyzer 306 calculates a value for the batch stage parameter based on the process control data. In some examples, such calculations are done in substantially real-time. In some examples, the calculations use the process control data as inputs to analyze the stage definitions received at block 402. At block 412, the batch stage analyzer 306 designates the current stage of the batch process based on the value of the batch stage parameter. That is, in some examples, the process control data will satisfy or correspond to a particular set of user-specified definitions and/or rules that define a particular stage in the batch process.

At block 414, the example batch stage analyzer 306 determines whether a new stage has begun. In some examples, a new stage is identified when the batch stage parameter is first detected as changing value. The different value of the batch stage parameter is an indication that the process control data associated with the process parameters satisfies different conditions corresponding to a different stage designated based on different user-specified definitions and/or rules. If the example batch stage analyzer 306 determines that a new stage has begun (block 414), control advances to block 416 where the example batch execution controller 312 stores the beginning of the current stage (i.e., the stage designated at block 412) in the continuous historian database 320. If the example batch stage analyzer 306 determines that a new stage has not begun (block 414), control advances to block 418

At block 418, the example batch stage analyzer 306 determines whether a previous stage has ended. In some examples, the ending of a stage is identified when the value of a batch stage parameter corresponds to a particular stage and then changes to a different value. In some examples, the ending of a previous stage corresponds to the beginning of a next stage such that the determination at block 414 may be sufficient to identify the ending of a previous stage. However, in some examples, the user-specified definitions and/or rules may define time gaps or space between successive stages to be analyzed in a batch process. As such, in some examples as shown, the beginning of a stage (block 414) and the ending of the stage (block 418) are separately determined. If the example batch stage analyzer 306 determines that a previous stage has ended (block 418), control advances to block 420 where the example batch execution controller 312 stores the ending of the previous stage (i.e., the stage designated at block 412 before the designation of the current stage) in the continuous historian database 320. If the example batch stage analyzer 306 determines that the previous stage did not end (block 418), control advances to block 422.

At block 422, the example batch execution controller 312 determines whether the batch process is complete. If not, control returns to block 406 to continue monitoring the process. Otherwise, control advances to block 424, where the example stage model generator 308 determines whether there are enough batches to generate a model. While a model could be generated based on a single batch process, typically, process control data from multiple batch processes are gathered before generating a model so that the model can be more robust. The particular number of batch processes used in model generation can be any suitable number desired. If the example stage model generator 308 determines that there are not enough batches to generate a model (block 424), control returns to block 404 to execute another batch process. If the example stage model generator 308 determines that there are enough batches to generate a model (block 424), control advances to block 426.

At block 426, the example stage model generator 308 generates a model based on the process control data from each batch process stored in the continuous historian database 320 between the corresponding beginning and ending of a stage. That is, in some examples, the appropriate process control data from each batch process is identified by identifying the boundaries of the relevant stage in each batch process based on the beginning and ending of the stage as stored at blocks 416 and 420. At block 428, the example batch execution controller 312 stores the generated model for the corresponding stage (e.g., in the stage model database 316). At block 430, the example batch execution controller 312 determines whether there is another stage to model. If so, control returns to block 426. Otherwise, the example method of FIG. 4 ends. Notably, while the batch execution engine 205 may monitor and store batch events in a batch historian database, such information is not relied on in the example method of FIG. 4 to identify stage boundaries. Rather, the stage boundaries are identified based on the process control data satisfying the particular stage definitions specified by a user at block 402.

As described above, in some examples, the determination of the value of the batch stage parameter and corresponding designation of each stage in a particular batch process may be accomplished at the control level (e.g., by a controller applying the user-specified definitions and/or rules to the process parameters). In some such examples, the identification of the beginning and ending of each stage in a batch process, as well as the storage in the continuous historian database 320 may be handled independent of the batch execution engine 205. That is, in some examples, blocks 408, 410, 412, 414, 416, 418, and 420 are implemented by a controller such that the batch execution engine 205 merely oversees the execution of each batch process until there have been enough batches to generate a model (block 424). In such examples, blocks 426, 438, and 430 are implemented in the same manner as described above.

Figure 5:
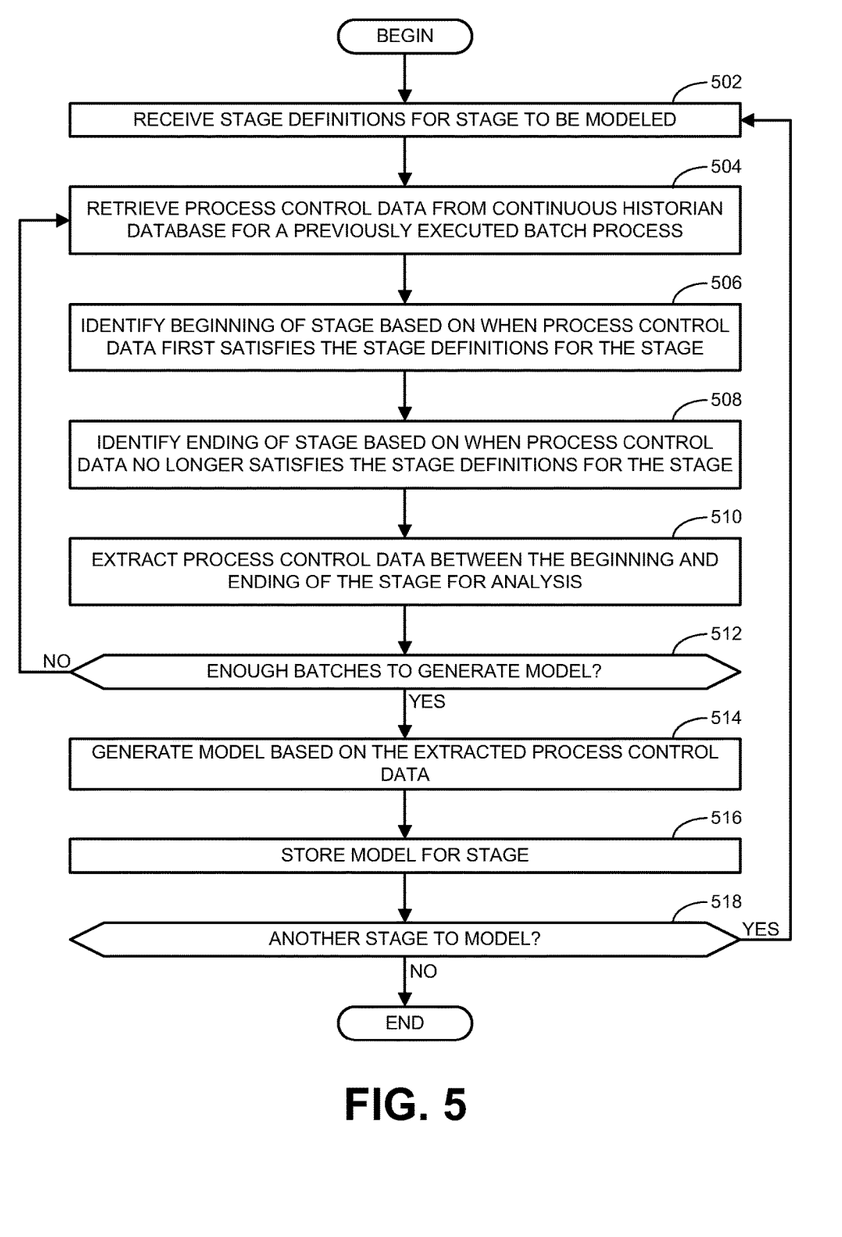

FIG. 5 is a flowchart representative of an example method to identify the beginning and ending of process stages in a set of previously executed batch processes that did not historize the batch stage parameter as described above in connection with FIG. 4. That is, in some examples, a process control system may have already implemented a number of batch processes prior to implementing the teachings disclosed herein to identify and store (e.g., in the continuous historian database 320) the beginning and ending of stages within each batch process. The example method of FIG. 5 enables the process control data collected from each previously executed batch process to be analyzed to extract the relevant portions for each stage in which a model is to be generated. In particular, the example method of FIG. 5 begins at block 502 where the example user interface 304 receives stage definitions for a stage to be modeled. In some examples, the stage definitions correspond to the stage definitions provided for the batch stage parameter described above in connection with block 402 of FIG. 4.

At block 504, the example batch execution controller 312 retrieves process control data from the continuous historian database 320 for a previously executed batch process. At block 506, the example batch stage analyzer 306 identifies the beginning of the stage based on when the process control data first satisfies the stage definitions for the stage to be modeled. At block 508, the example batch stage analyzer 306 identifies the ending of the stage based on when the process control data no longer satisfies the stage definitions for the stage to be modeled. At block 510, the example stage model generator 308 extracts the process control data between the beginning and ending of the stage for analysis.

At block 512, the example stage model generator 308 determines whether there are enough batches to generate a model. If not, control returns to block 504 to retrieve process control data from another previously executed batch process. If the example stage model generator 308 determines that there are enough batches to generate a model (block 512), control advances to block 514 where the example stage model generator 308 generates a model based on the extracted process control data. At block 516, the example batch execution controller 312 stores the generated model for the corresponding stage (e.g., in the stage model database 316). At block 518, the example batch execution controller 312 determines whether there is another stage to model. If so, control returns to block 502. Otherwise, the example method of FIG. 5 ends. Notably, while batch events associated with the previously executed batch processes may have been collected and stored in a batch historian database, such information is not relied on in the example method of FIG. 5 to identify stage boundaries. Rather, the stage boundaries are identified based on the process control data satisfying the particular stage definitions specified by a user at block 502.

Figure 6:
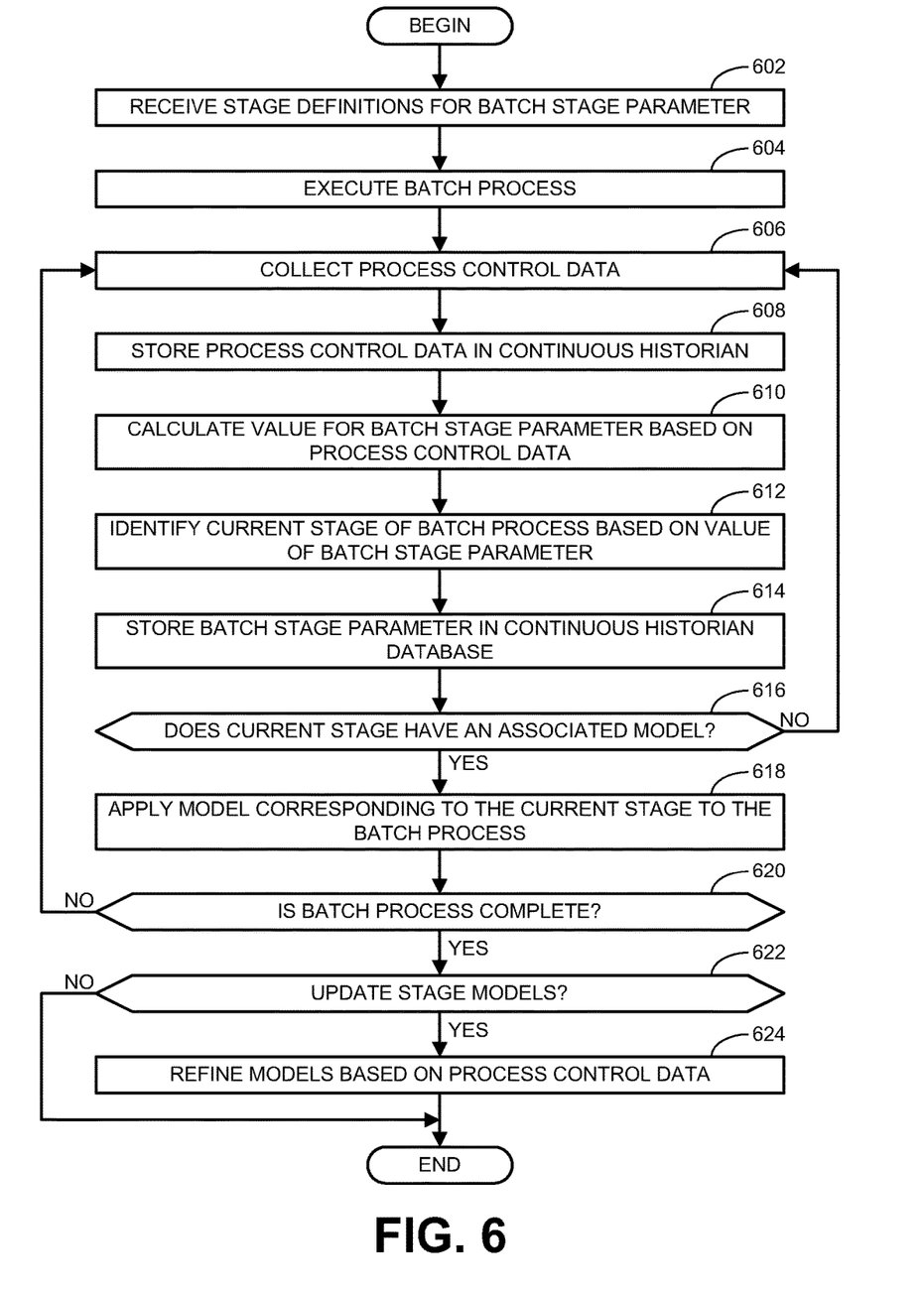

FIG. 6 is a flowchart representative of an example method to apply models to a currently executing batch process that align with the stages of the batch process. The example method begins at block 602 where the example user interface 304 receives (e.g., from a user) stage definitions for a batch stage parameter. At block 604, the example batch execution controller 312 executes a batch process. At block 606, the example communication interface 302 collects process control data. At block 608, the example batch execution controller 312 stores the process control information in the example continuous historian database 320. At block 610, the example batch stage analyzer 306 calculates a value for the batch stage parameter based on the process control data. At block 612, the example batch stage analyzer 306 identifies a current stage of the batch process based on the value of the batch stage parameter. At block 614, the example batch execution controller 312 stores the batch stage parameter in the continuous historian database 320. In some examples, the batch stage parameter is stored at the identified beginning and ending of the stage as described above in connection with blocks 414-420 of FIG. 4.

At block 616, the example batch model analyzer 310 determines whether the current stage has an associated model. If not, control returns to block 606. If the example batch model analyzer 310 determines that the current stage does have an associated model, control advances to block 618 where the example batch model analyzer 310 applies the model corresponding to the current state to the batch process. At block 620, the example batch execution controller 312 determines whether the batch process is complete. If not, control returns to block 606. Otherwise, control advances to block 622 where the example batch execution controller 312 determines whether to update the stage models. If not, the example method of FIG. 6 ends. If the example batch execution controller 312 determines to update the stage models, control advances to block 624 where the example stage model generator 308 refines the models based on the process control data. After refining the models, the example method of FIG. 6 ends. Notably, while the batch execution engine 205 may monitor and store batch events in a batch historian database, such information is not relied on in the example method of FIG. 6 to identify stage boundaries. Rather, the stage boundaries are identified based on the process control data satisfying the particular stage definitions specified by a user at block 602.

Figure 7:
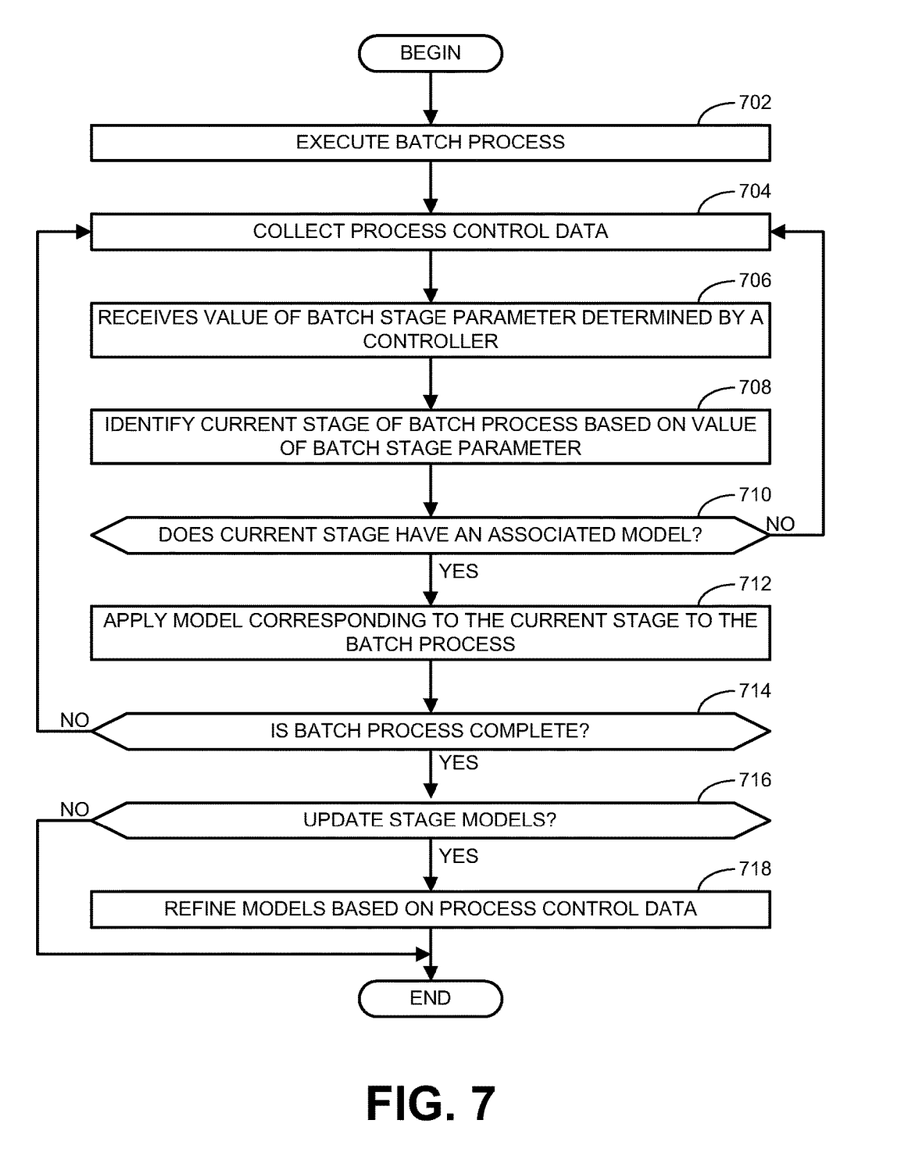

FIG. 7 is a flowchart representative of another example method to apply models to a currently executing batch process that align with the stages of the batch process. While the example method of FIG. 6 corresponds to when the batch execution engine 205 determines the current stage by determining the value of the batch stage parameter, the example method of FIG. 7 corresponds to when the value of the batch stage parameter is provided to the batch execution engine 205 (e.g., from a controller). The example method begins at block 702 where the example batch execution controller 312 executes a batch process. At block 704, the example communication interface 302 collects process control data. At block 706, the example communication interface 302 receives the value of a batch stage parameter determined by a controller. At block 708, the example batch stage analyzer 306 identifies a current stage of the batch process based on the value of the batch stage parameter. At block 710, the example batch model analyzer 310 determines whether the current stage has an associated model. If not, control returns to block 704. If the example batch model analyzer 310 determines that the current stage does have an associated model, control advances to block 712 where the example batch model analyzer 310 applies the model corresponding to the current state to the batch process. At block 714, the example batch execution controller 312 determines whether the batch process is complete. If not, control returns to block 704. Otherwise, control advances to block 716 where the example batch execution controller 312 determines whether to update the stage models. If not, the example method of FIG. 7 ends. If the example batch execution controller 312 determines to update the stage models, control advances to block 718 where the example stage model generator 308 refines the models based on the process control data. After refining the models, the example method of FIG. 7 ends.

Figure 8:
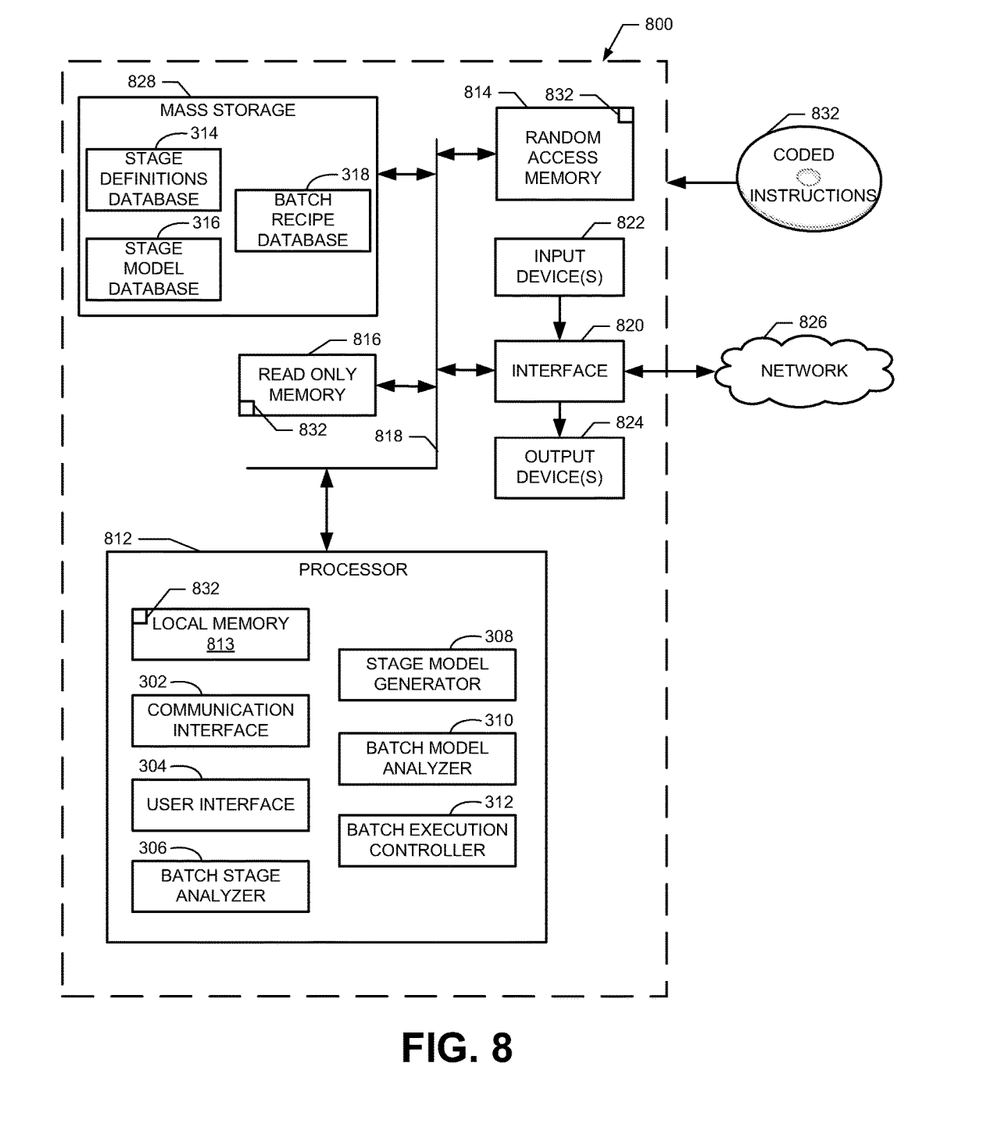
FIG. 8 is a schematic illustration of an example processor platform that may be used and/or programmed to carry out the example methods of FIGS. 4-7, and/or, more generally, to implement the example batch execution engine of FIGS. 2 and/or 3.

FIG. 8 is a block diagram of an example processor platform 800 capable of executing the instructions to implement the methods of FIGS. 4-7 and the example batch execution engine 205 of FIGS. 2 and/or 3. The processor platform 800 can be, for example, a server, a personal computer, a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). In the illustrated example, the processor 812 implements the example communication interface 302, the example user interface 304, the example batch stage analyzer 306, the example stage model generator 308, the example batch model analyzer 310, and/or the example batch execution controller 312. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. For example, the mass storage device 828 may include the example continuous historian database 320, the example stage definitions database 314, the example stage model database 316, and/or the example batch recipe database 318 of FIG. 3. Examples of such mass storage devices 828 include floppy disk drives, hard drive disks, compact disk drives, Blu-ray disk drives, RAID systems, and digital versatile disk (DVD) drives.

Coded instructions 832 to implement the methods of FIGS. 4-7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable more accurate identification of process stages corresponding to particular process dynamics or interactions of process parameters throughout a batch process over known approaches that tie stages to batch events. As a result, the teachings disclosed herein enable more accurate identification of relevant process control data for generating models to apply for batch processes because the process control data occurring between the beginning and ending of a particular stage can be specifically isolated. Additionally, the precise beginning and ending of a stage in a currently executed batch process can be more precisely identified to determine the proper time to apply the models. In this manner, the batch control analytics can provide more accurate and reliable feedback and analysis on a current batch process than other known methods.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   determining, with a processor, a current stage in a current batch process based on a current value of a batch stage parameter, the current value of the batch stage parameter determined based on process control data associated with process parameters in the current batch process, the current stage determined independent of batch events, the batch events defined by at least one of a start or an end of procedures, unit procedures, operations, or phases in a batch recipe;
   analyzing, with the processor, the process control data relative to a first model during the current stage, the first model corresponding to the current stage;
   analyzing, with the processor, the process control data relative to a different model when the batch stage parameter corresponds to a different value other than the current value, the different model corresponding to a different stage of the current batch process other than the current stage, wherein boundaries of the current stage and the different stage do not correspond to the batch events; and
   controlling execution of the current batch process during the respective current and different stages based on the analysis of the process control data relative to the respective first and different models.

2. The method of claim 1, wherein the current value of the batch stage parameter is defined based on user-specified definitions associated with conditions of the process parameters without reference to the batch events.

3. The method of claim 1, wherein the current stage is defined by operator input received between successive ones of the batch events during runtime of the current batch process, wherein the operator input satisfies a user-specified rule to define the current value of the batch stage parameter.

4. The method of claim 1, wherein the current stage corresponds to a portion of the current batch process associated with a particular interaction of the process parameters.

5. The method of claim 1, further including generating the first model for the current stage of the current batch process based on a corresponding stage in each of multiple previously executed batch processes.

6. The method of claim 5, wherein the first model is generated by:
   retrieving the process control data associated with the previously executed batch processes stored in a continuous historian database;
   detecting a beginning of the corresponding stage in each previously executed batch process based on when the process control data associated with each previously executed batch process first satisfies user-specified definitions defining the current value of the batch stage parameter;
   detecting an ending of the corresponding stage in each previously executed batch process based on when the process control data associated with each previously executed batch process no longer satisfies the user-specified definitions; and
   analyzing the process control data associated with the previously executed batch processes between the beginning and the ending of the corresponding stage in each of the previously executed batch processes.

7. The method of claim 1, further including:
   determining a beginning of the current stage based on when the batch stage parameter first corresponds to the current value;
   determining an ending of the current stage based on when the batch stage parameter no longer corresponds to the current value; and
   storing the beginning and the ending of the current stage in a continuous historian database along with the process control data.

8. The method of claim 7, further including refining the first model for subsequent batch processes based on the process control data stored in the continuous historian database between the beginning and the ending of the current stage.

9. An apparatus comprising:
   a batch stage analyzer, implemented via a processor, to determine a current stage in a current batch process based on a current value of a batch stage parameter, the current value of the batch stage parameter determined based on process control data associated with process parameters in the current batch process, the current stage determined independent of batch events, the batch events defined by at least one of a start or an end of procedures, unit procedures, operations, or phases in a batch recipe; and
   a batch model analyzer, implemented via the processor, to analyze the process control data relative to a first model during the current stage, the first model corresponding to the current stage, the batch model analyzer to analyze the process control data relative to a different model during a different stage other than the current stage when the batch stage parameter corresponds to a different value other than the current value, the different model corresponding to the different stage, wherein boundaries of the current stage and the different stage do not correspond to the batch events, execution of the current batch process controlled during the respective current and different stages based on the analysis of the process control data relative to the respective first and different models.

10. The apparatus of claim 9, wherein the current value of the batch stage parameter is defined based on user-specified definitions associated with conditions of the process parameters without reference to the batch events.

11. The apparatus of claim 10, wherein the current value of the batch stage parameter is determined by a controller executing the batch process, the controller to compare the user-specified definitions to current values of the process parameters.

12. The apparatus of claim 9, wherein the current value of the batch stage parameter is determined by the batch stage analyzer.

13. The apparatus of claim 9, further including a model generator to generate the first model for the current stage of the current batch process based on a corresponding stage in each of multiple previously executed batch processes.

14. The apparatus of claim 13, wherein the model generator is to:
   retrieve the process control data associated with the previously executed batch processes stored in a continuous historian database;
   detect a beginning of the corresponding stage in each previously executed batch process based on when the process control data associated with each previously executed batch process first satisfies user-specified definitions defining the current value of the batch stage parameter;
   detect an ending of the corresponding stage in each previously executed batch process based on when the process control data associated with each previously executed batch process no longer satisfies the user-specified definitions; and
   analyze the process control data associated with the previously executed batch processes between the beginning and the ending of the corresponding stage in each of the previously executed batch processes.

15. The apparatus of claim 9, wherein the batch stage analyzer is to:
   determine a beginning of the current stage based on when the batch stage parameter first corresponds to the current value;
   determine an ending of the current stage based on when the batch stage parameter no longer corresponds to the current value; and
   store the beginning and the ending of the current stage in a continuous historian database along with the process control data.

16. An article of manufacture comprising instructions that, when executed, cause a machine to at least:
   determine a current stage in a current batch process based on a current value of a batch stage parameter, the current value of the batch stage parameter determined based on process control data associated with process parameters in the current batch process, the current stage determined independent of batch events, the batch events defined by at least one of a start or an end of procedures, unit procedures, operations, or phases in a batch recipe;
   analyze the process control data relative to a first model during the current stage, the first model corresponding to the current stage;
   analyze the process control data relative to a different model when the batch stage parameter corresponds to a different value other than the current value, the different model corresponding to a different stage of the current batch process other than the current stage, wherein boundaries of the current stage and the different stage do not correspond to the batch events; and
   control execution of the current batch process during the respective current and different stages based on the analysis of the process control data relative to the respective first and different models.

17. The article of manufacture of claim 16, wherein the instructions further cause the machine to generate the first model for the current stage of the current batch process based on a corresponding stage in each of multiple previously executed batch processes.

18. The article of manufacture of claim 17, wherein the first model is generated by:
   retrieving the process control data associated with the previously executed batch processes stored in a continuous historian database;
   detecting a beginning of the corresponding stage in each previously executed batch process based on when the process control data associated with each previously executed batch process first satisfies user-specified definitions defining the current value of the batch stage parameter;
   detecting an ending of the corresponding stage in each previously executed batch process based on when the process control data associated with each previously executed batch process no longer satisfies the user-specified definitions; and
   analyzing the process control data associated with the previously executed batch processes between the beginning and the ending of the corresponding stage in each of the previously executed batch processes.

19. The article of manufacture of claim 16, wherein the instructions further cause the machine to:
   determine a beginning of the current stage based on when the batch stage parameter first corresponds to the current value;
   determine an ending of the current stage based on when the batch stage parameter no longer corresponds to the current value; and
   refine the first model for subsequent batch processes based on the process control data stored in a continuous historian database between the beginning and the ending of the current stage.

* * * * *